US007717303B2

(12) United States Patent
Rampini et al.

(10) Patent No.: US 7,717,303 B2
(45) Date of Patent: May 18, 2010

(54) PUMP FOR MANUALLY DISPENSING A FLUID SUBSTANCE SEALED IN A CONTAINER

(75) Inventors: Gabriele Rampini, Milan (IT); Matteo Moretti, Crema (IT)

(73) Assignee: LUMSON S.p.A., Capergnanica (IT)

( * ) Notice: Subject to any disclaimer, the term of this patent is extended or adjusted under 35 U.S.C. 154(b) by 852 days.

(21) Appl. No.: 11/418,253

(22) Filed: May 5, 2006

(65) Prior Publication Data

US 2006/0243748 A1 Nov. 2, 2006

Related U.S. Application Data

(63) Continuation of application No. PCT/EP2005/056754, filed on Dec. 13, 2005.

(30) Foreign Application Priority Data

Feb. 9, 2005 (IT) .......................... MI2005A0180
Mar. 9, 2006 (IT) .......................... MI2006A0423

(51) Int. Cl.
*G01F 11/00* (2006.01)

(52) U.S. Cl. .................. 222/321.2; 222/321.9; 222/394

(58) Field of Classification Search ................. 222/256, 222/321.1, 321.2, 321.7, 321.9, 341, 386.5, 222/389, 373, 402.3, 37, 263, 394, 402.2
See application file for complete search history.

(56) References Cited

U.S. PATENT DOCUMENTS 3,211,346 A 10/1965 Meshberg
4,056,216 A * 11/1977 Kotuby ........................ 222/385
4,230,242 A 10/1980 Meshberg
4,511,069 A 4/1985 Kalat
4,842,495 A * 6/1989 Howlett ....................... 417/488
4,960,230 A * 10/1990 Marelli ..................... 222/321.9
4,964,547 A * 10/1990 Lina ........................... 222/385
5,626,264 A * 5/1997 Florez et al. ............. 222/321.2
6,047,856 A * 4/2000 Meshberg et al. .............. 222/1
6,779,690 B2 * 8/2004 Masuzzo et al. ......... 222/321.4
2003/0150880 A1 * 8/2003 Marelli ..................... 222/321.7

FOREIGN PATENT DOCUMENTS

| | | |
|---|---|---|
| EP | 0 086 144 | 8/1983 |
| EP | 0 487 412 A1 | 5/1992 |
| FR | 2 881 383 A1 | 1/2002 |
| FR | 2 842 875 | 1/2004 |
| GB | 1 537 436 | 12/1978 |
| WO | WO 98/18564 | 5/1998 |

* cited by examiner

*Primary Examiner*—Kevin P Shaver
*Assistant Examiner*—Daniel R Shearer
(74) *Attorney, Agent, or Firm*—Oblon, Spivak, McClelland, Maier & Neustadt, L.L.P.

(57) ABSTRACT

A pump enabling a fluid substance to be manually dispensed through a hollow stem projecting from a hole in a ring cap sealedly applied to one end of a pump.

The stem can sealedly translate within said hole in the ring cap, which in its turn can be sealedly mounted on the mouth of a container containing the fluid substance to be dispensed.

16 Claims, 4 Drawing Sheets

PUMP FOR MANUALLY DISPENSING A FLUID SUBSTANCE SEALED IN A CONTAINER

CROSS REFERENCES TO RELATED APPLICATIONS

This application is a continuation of PCT Patent Application No. PCT/EP2005/056754, filed on Dec. 13, 2005, and claims priority to Italian Patent Applications No. MI2005A000180, filed on Feb. 9, 2005, and MI2006A 000423, filed on 9 Mar. 2006, all of which are incorporated herein by reference in their entireties.

BACKGROUND OF THE INVENTION

1. Field of the Invention

The present invention relates to an improved manually operable pump for dispensing quantities of a fluid substance in the form of liquids, creamy substances or the like through the hollow operating stem of the pump. The pump enables the substance to be dispensed when in any position while preventing, under normal conditions of use, the passage of fluids (air, gas or liquid) between the outer surface of the stem and the adjacent surface of the hole in the pump ring cap through which said stem extends and is translatable.

2. Discussion of the Background

Many types of manually operable pumps are known for externally dispensing, through the cavity of a stem during its operation, quantities of fluid substances (liquid or creamy) drawn from a container on which the pump is mounted; the hollow stem extends to the outside of the pump body by passing through a hole provided in a ring cap forming part of the pump and defining one end of said pump. The term "ring cap" means any body or element for closing the pump body at one end and for enabling the stem to pass. Known pumps are mounted on containers in which the pressure under rest conditions is substantially equal to atmospheric pressure.

Examples of known types of pumps are those described in detail in U.S. Pat. No. 3,583,605A, U.S. Pat. No. 4,960,230A, EP-B-0301615 and EP-A-1334774, the teachings of which are incorporated herein for reference. DE 1728199A also describes a pump very similar to those illustrated in the four aforesaid patents.

To prevent a vacuum forming in the container when fluid is withdrawn therefrom and dispensed by the pump, a passageway or aperture must be provided in the pump to enable atmospheric air to penetrate into the container in order to maintain the pressure substantially constant therein equal to the atmospheric pressure. In the known art, air passes through a passageway provided in the pump body or between the pump and the ring cap on which the pump is mounted, the air always passing between the outer surface of the hollow stem and the opposing surface of the hole provided in the pump ring cap through which the stem passes.

This is clearly specified in all the aforesaid prior patents, for example in lines 62-67 of column 2 of U.S. Pat. No. 3,583,605A, in lines 2-5 of column 4 of U.S. Pat. No. 4,960,230A, in the last three lines of column 4 and the first two lines of column 5 of EP-B-0301615, in lines 14-22 of column 1 of EP-A-1334774, and in the first paragraph of page 8 of DE 1728199A. The passageway existing between the outer surface of the pump hollow stem and the surface of the hole in the ring cap through which the stem passes presents problems, one of which is that the external air which penetrates into the container can deteriorate the characteristics of the fluid substance contained therein, another being the fact that the fluid can seep or leak to the outside of the container through the said passageway when the container and pump lie in a horizontal position or with the pump facing downwards from the container.

These problems cannot be prevented with known pumps because atmospheric air must be able to enter the container to prevent the pump blocking (and hence no longer usable) if a vacuum forms within the container on dispensing a portion of the fluid contained therein.

In a different embodiment, the fluid substances to be dispensed by dispensers for their use must be contained in containers in which a pressurized gas is also present to normally expel the substances under pressure through dispensing devices acting as manually operable aerosol valves, the opening or closure of which results in dispensing or prevents dispensing of the substance respectively.

However, pumps are also known for dispensing a fluid substance and a pressurizing gas from a container containing the substance and the pressurizing gas hermetically sealed therein. Such pumps have structures which seem similar to those of the pumps commonly used on containers which are not internally pressurized, but which are clearly distinct from them.

Some of these pumps are described for example in U.S. Pat. No. 3,211,346A, U.S. Pat. No. 4,511,069A and GB 1537436A, the teachings of which are incorporated herein for reference.

All these pumps present problems which have made them difficult to use, and in fact have prevented their practical utilization. In this respect, such pumps have substantially a form similar to that of a traditional pump but differ therefrom by comprising a cup-shaped body, the cavity of which is sealed by a ring cap sealedly applied to the mouth of a container in which a fluid substance and a pressurized gas are contained. The cup-shaped body presents a chamber with a hole through which the fluid substance rises into the chamber by the effect of the pressure present in the container. This chamber is bounded by a piston sealedly translatable along the inner surface of the cup-shaped body: a hollow stem connected to the piston emerges from and is sealedly translatable through a hole provided in the pump ring cap. Under rest conditions in which the piston is urged by a compressed spring reacting against the cup-shaped body, the cavity in the pump stem is closed by a unidirectional valve.

When the pump is at rest, the pressurized fluid substance present in the pump interior acts on the piston in the sense of maintaining the pump closed, no hole or aperture or passageway being provided in the pump body which would enable the fluid substance or pressurized gas to come into contact with that upper piston surface distant from that facing the interior of the pump cup-shaped body. The consequence of this is that when such pump is operated to dispense a substance, a pressure must be exerted on the pump stem which is greater than that required to operate the common pumps used to dispense substances not under pressure, in order to overcome the thrust of the spring acting on the piston and to overcome the thrust exerted on the same piston by the pressurized fluid substance present within the pump cavity. Pump operation is hence more difficult the higher the internal pressure in the container on which the pump is mounted, and the smaller the size of the dispensing button mounted on the free end of the hollow stem.

SUMMARY OF THE INVENTION

The main object of the present invention is to provide a pump which does not allow air, gas or liquids to pass between the outer surface of the respective stem and the surface of the hole in the pump ring cap, under any condition in which the pump is used.

Another object is to provide a pump which can be sealedly mounted on a container to define therewith a hermetically sealed space, from which however the pump can withdraw and dispense quantities of the fluid substance.

A further object is to provided a pump which can be easily primed (to enable, on initial use, the fluid substance to be withdrawn from the container on which the pump is mounted).

These and further objects are attained by a pump for manually dispensing quantities of a fluid substance sealedly contained in a container, comprising a cup-shaped body having an open end on which a ring cap is applied, and a closed end in which a hole is provided through which the fluid substance can, via a unidirectional valve, enter a lower pump chamber from which the substance can be expelled by being dispensed to the outside of the pump, said lower chamber being bounded by an annular piston sealedly translatable both along the inner surface of the cup-shaped body and along the outer surface of a hollow operating stem for dispensing the fluid substance, said stem extending from and being axially translatable through a hole provided in said ring cap which with said piston defines an upper pump chamber, wherein the outer surface of the stem seals against the opposing surface of the hole in the ring cap which is deprived of any further holes or apertures, the ring cap is sealedly applied on the open end of the cup-shaped body and in the cup-shaped body there is provided at least one passageway which connects said upper chamber to the outside of said cup-shaped body.

Further objects are attained by a pump characterised in that, from the cup-shaped body there projects into said chamber a stop element on which said lower collar rests and halts when the stem is pressed to its end-of-travel position, whereas the lip of the piston is kept urged by the spring towards and against said lower collar to close said aperture, from the inner surface of the cup-shaped body in proximity to and above said stop element there projecting at least one short longitudinal rib on which the lower edge of the piston lip rests and is deformed to leave free a passageway between the lip and the opposing surface of the cup-shaped body.

A new and particularly interesting utilization of the pump of the present invention is that when the pump is mounted on a container such as to define therewith a hermetically sealed space in which the fluid substance present generates a pressurized gaseous phase, in particular there being present in said hermetically sealed space at least one low-boiling liquid having a saturated vapour pressure less than 1.00 $kg/cm^2$ at 15° C. and less than 2.8 $kg/cm^2$ at 37.8° C. which generates a slight vapour pressure at an ambient temperature of 21° C.

Low-boiling liquids are fluid chemical substances which have a boiling point between +15° C. and +85° C. and develop a pressure of 1 atm (about 760 mm·Hg).

Advantageously usable low-boiling liquids are those chosen from the group consisting of isopentane, isohexane, N-pentane, N-hexane, dichloromethane, monochloropropane, 1-1-dichloroethane, 2-chlorobutane, trichloro-fluoromethane CFC 11, trichloro-tifluoro-ethane CFC 113, ethyl ether, methylene-dimethylether, dimethoxymethane and acetone.

BRIEF DESCRIPTION OF THE DRAWINGS

The structure and characteristics of the pump according to the invention will be more apparent from the description of two embodiments thereof, given by way of non-limiting examples with reference to the accompanying drawings, in which:

FIGS. from 1 to 4 are longitudinal sections through one embodiment of the pump shown respectively in its rest state, at the commencement of the dispensing stage, at the end of its dispensing stroke, and in an intermediate position of the stage in which the liquid substance is drawn into the pump lower chamber.

Figure 7:
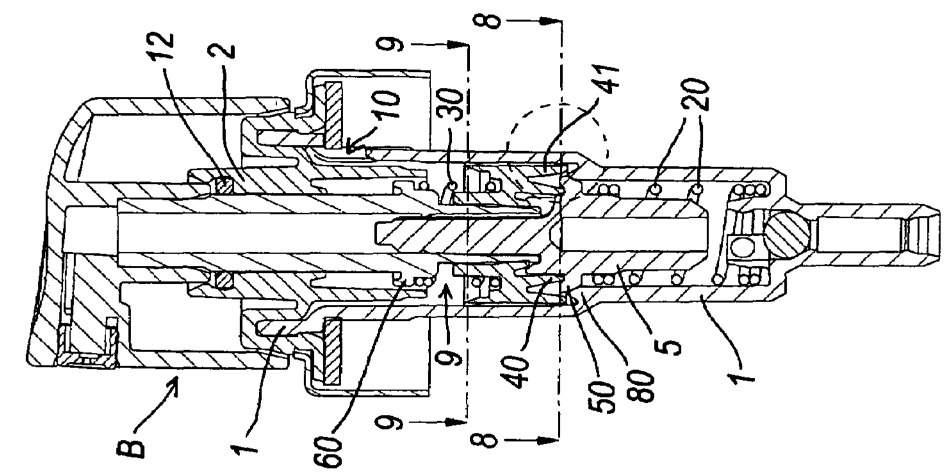
Figure 6:
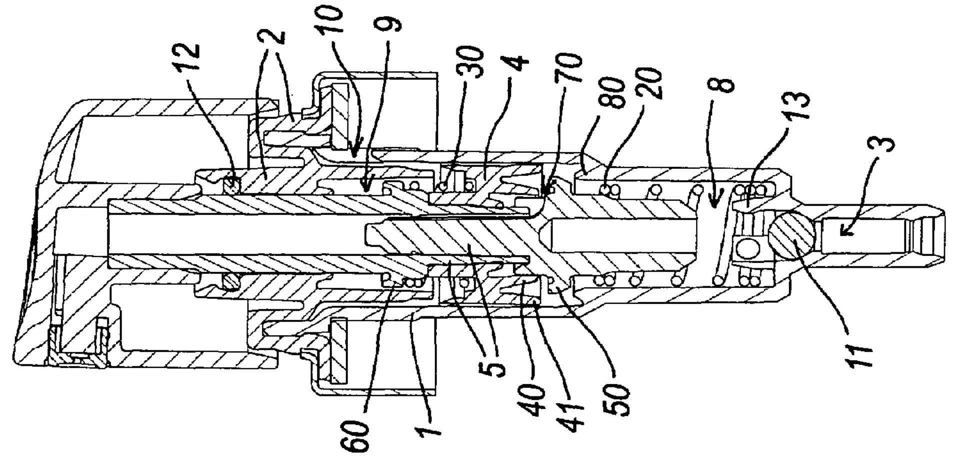
Figure 5:
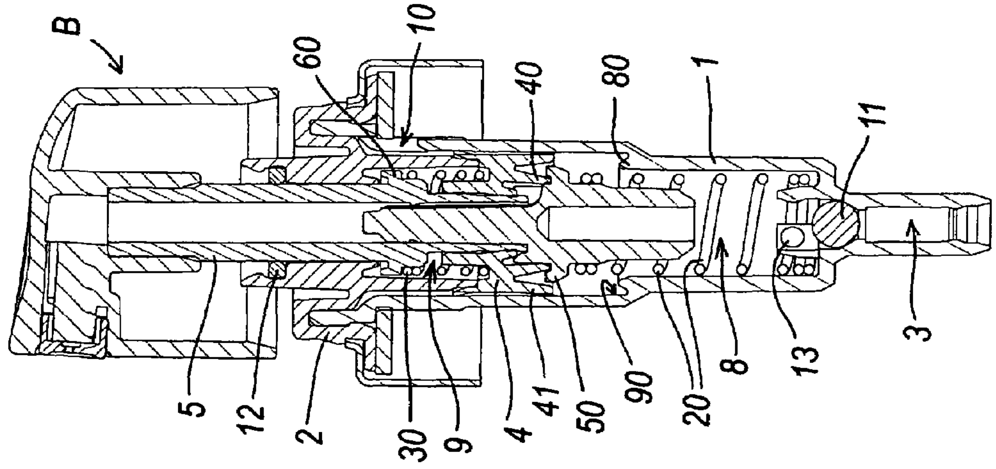
Figure 7A:
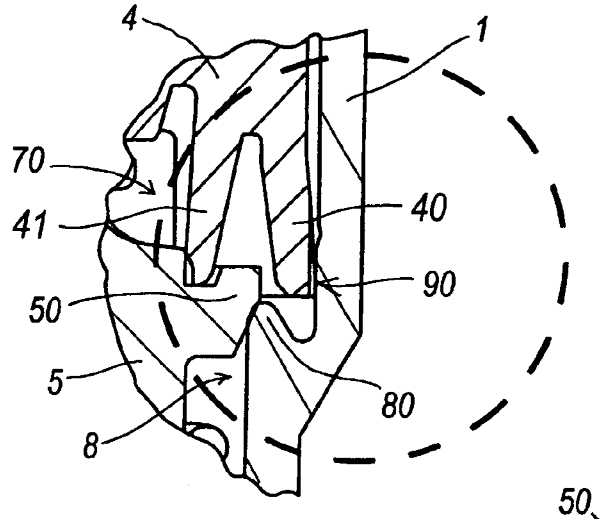
Figure 8:
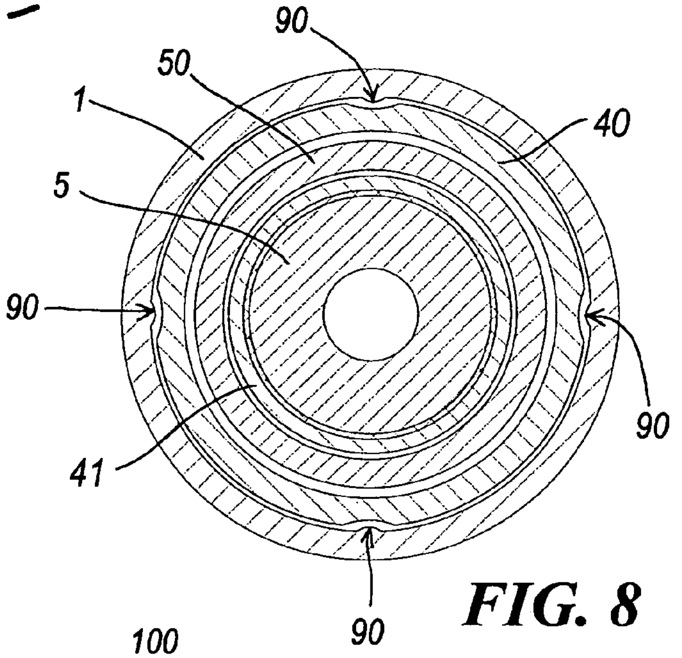
Figure 9:
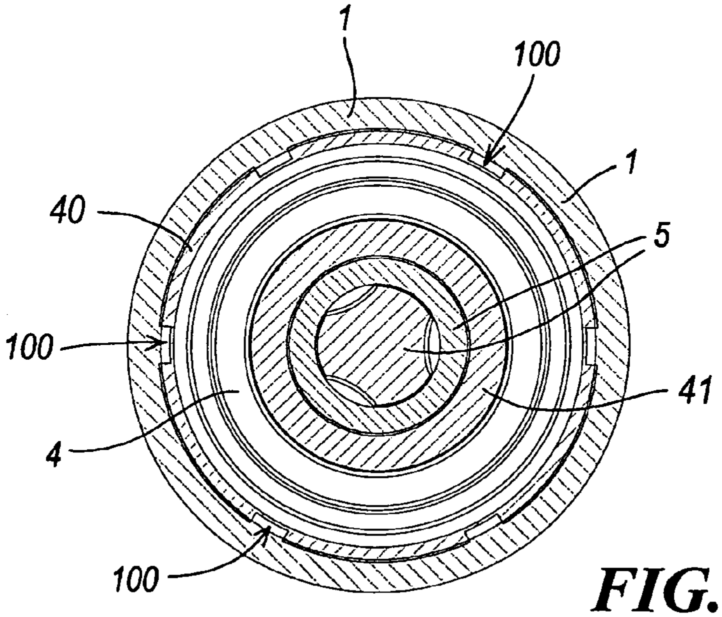

FIGS. from 5 to 7 are longitudinal sections through a preferred embodiment of a pump shown in its rest state, at the commencement of the dispensing stage, at the end of its dispensing stroke;

FIG. 7A shows on an enlarged scale that portion of the pump bounded by a dashed-line circle in FIG. 7; and FIGS. 8 and 9 are enlarged cross-sections through the pump, taken on the lines 8-8 and 9-9 respectively of FIG. 7.

DETAILED DESCRIPTION OF THE INVENTION

FIGS. from 1 to 4 show a pump the structure of which is of known type, except for the following details. To give a specific example, the pump has a structure totally similar or equal to that of the pumps illustrated in the prior patents specified in the introduction to this description, and of which the teachings are incorporated herein for reference: the pump structure and operation will therefore not be described in detail for brevity.

The pump comprises a cup-shaped body 1 closed at one end by a ring cap 2 and presenting at its other end a hole 3 which opens into the hollow space defined by a container (not shown in the drawings) on the mouth of which the pump ring cap 2 is mounted and sealed in any known manner (for example by crimping, etc.).

The interior of the cup-shaped body houses an annular piston 4, which is translatable along and seals against the inner surface of the cup-shaped body and respectively against the outer surface of a hollow stem 5 translatable axially through a hole provided in the flange 2 and along the cavity of which the fluid substance can be expelled to the outside (and hence used), having been previously drawn into a lower pump chamber 8 lying between the lower surface (with respect to the drawings) of the piston 4 and the pump intake hole 3 which houses a unidirectional valve consisting of a ball 11 movable between a sealing seat provided at the upper end of the hole 3 and stop elements 13 forming part of the pump body. An upper chamber 9 is defined in the cup-shaped body between the top of the piston 4 and the flange 2 and communicates with the outside of the cup-shaped body 1 via a hole or passageway 10 provided directly in the cup-shaped body: in this manner, when the pump is sealedly mounted on the mouth of a container, the pressure in the upper pump chamber 9 is always equal to the pressure in the container on which the pump is sealedly mounted.

In all conditions under which the pump is used or at rest, a hermetic seal exists between the outer surface of the stem 5 and the opposing surface of the hole in the ring cap 2 through which the stem extends and is translatable, and in the case of the embodiment shown in the figures is provided by a gasket or O-ring 12 of rubber or a suitable elastomeric material (although the seal between the stem and the hole in the ring cap can be provided in a different manner, for example by simply providing a lip, not shown for simplicity, forming part of the ring cap 2, which can be formed of deformable plastic material, such as polyethylene, polypropylene etc.).

The main and essential characteristic of the pump of the present invention is that its hollow stem 5 is always housed and translatable in a sealed state (in all conditions under which the pump is used or is at rest) within the guide hole in the ring cap 2, and that in addition the cup-shaped body 1 of the pump is provided with the hole or passageway 10 at the upper chamber 9 of the pump body.

The result is that as the upper pump chamber 9 cannot enable liquids, air or gas to seep between the outer surface of the stem and the ring cap hole through which this stem extends, and the ring cap 2 is mounted hermetically sealed on the mouth of a container (not shown for simplicity), there are no undesirable leakages or seepages of gas-phase product, air or fluids between the stem 5 and the gasket 12 of the ring cup 2. Moreover it should be noted that the pressure in the upper pump chamber 9 is always equal (because of the presence of the passageway 10) to the pressure in the container on which the pump is mounted hermetically sealed.

Consequently, assuming that the pump is sealedly mounted on the mouth of a known cylindrical container closed at its other end by a movable base which moves each time the substance contained in the container is dispensed, air cannot penetrate into the container in any condition under which it is used, so that the product or substance contained therein does not become contaminated by the air, or cannot harden or dry.

The same applies if the pump is mounted on a deformable bag which is squeezed by atmospheric pressure or if the pump is mounted on a rigid container.

A particularly interesting and advantageous utilization of the pump is that in which a rigid container (on which the pump is mounted such as to define a hermetically sealed space in the container interior) contains a fluid, semidense or pasty substance mixed with low-boiling liquids able to generate a slight vapour pressure under normal conditions of use, i.e. at about 21° C.

Low-boiling liquids are liquids having a saturated vapour pressure less than 1.00 kg/cm$^2$ at 15° C. and less than 2.8 kg/cm$^2$ at 37.80° C.

Low-boiling liquids are fluid chemical substances which have a boiling point between +15° C. and +85° C. and develop a pressure of 1 atm (about 760 mm·Hg).

Preferred low-boiling liquids particularly advantageous for the aforestated use are those chosen from the group consisting of isopentane, isohexane, N-pentane, N-hexane, dichloromethane, monochloropropane, 1-1-dichloroethane, 2-chlorobutane, trichloro-fluoro-methane CFC 11, trichlorotifluoro-ethane CFC 113, ethyl ether, methylene-dimethylether, dimethoxymethane and acetone.

When using a low-boiling liquid of this type, as the fluid mixture is dispensed by the pump, the low-boiling liquid present in the container evaporates from its liquid phase present in the mixture and restores the desired pressure within the container (slightly higher than atmospheric), to prevent formation in the container of a vacuum which would hinder continuation of dispensing from the rigid container.

Figure 1:
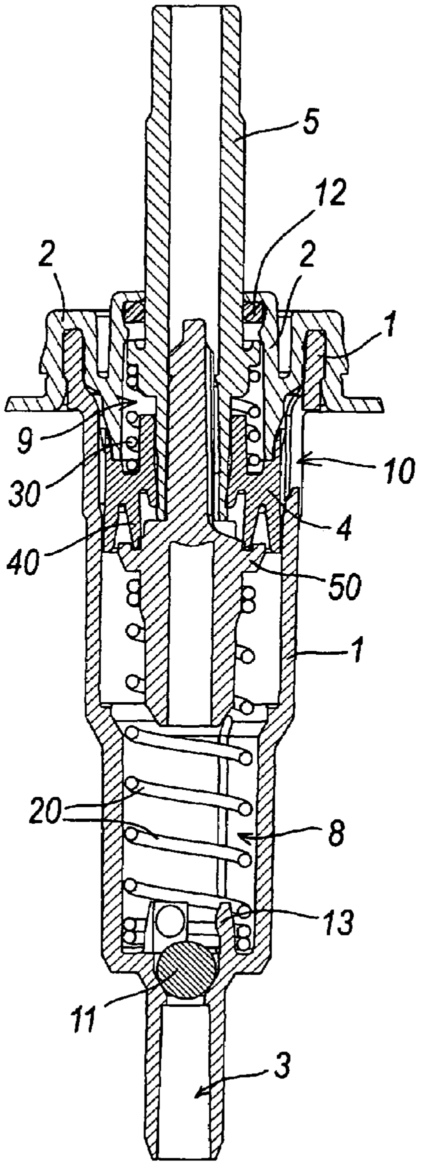
Figure 2:
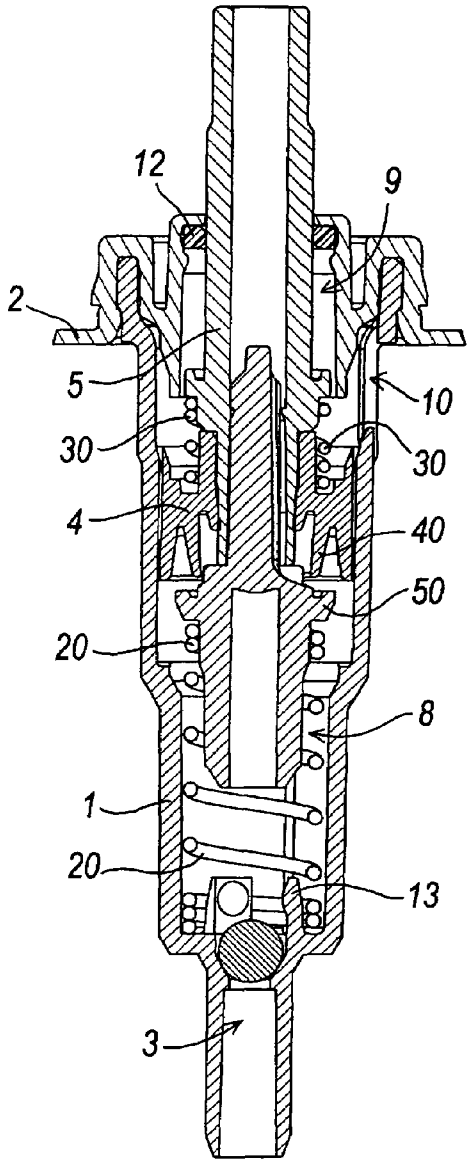
Figure 3:
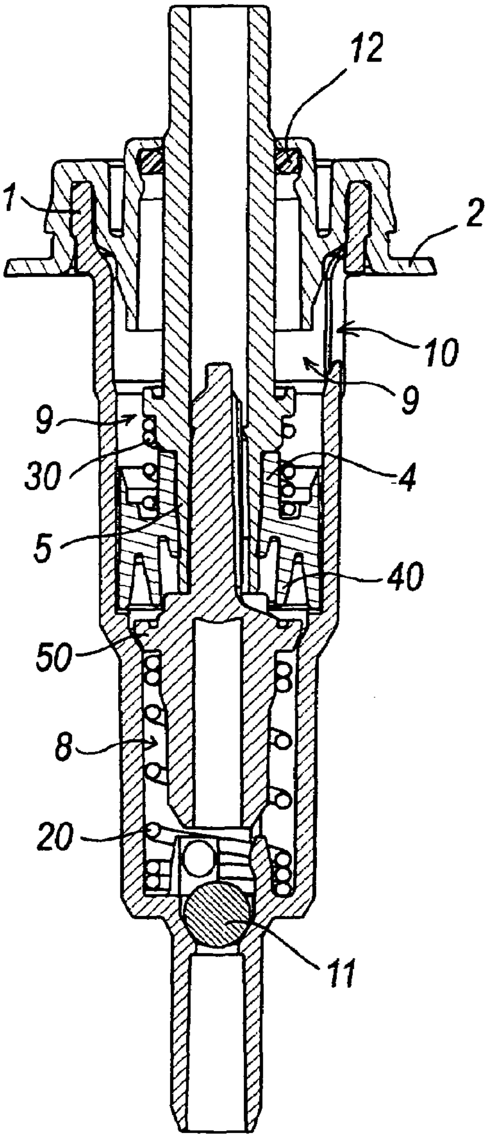
Figure 4:
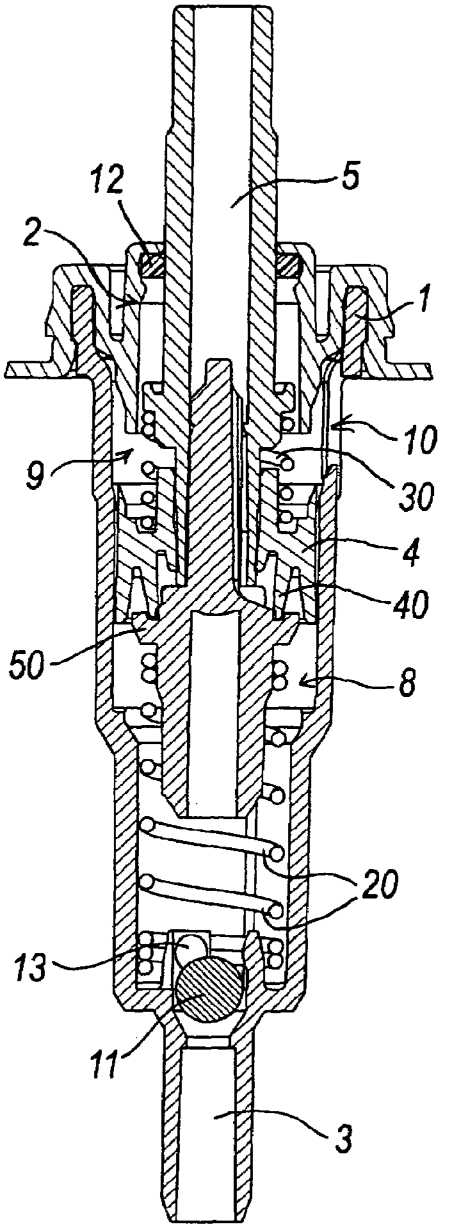

A particularly important characteristic of the pump described with reference to the drawings is that, when at rest, the pressure in the pump lower chamber 8 is equal to that in the upper chamber 9, so that the pressure acting on the upper and lower surfaces of the piston 4 is the same. It follows that to dispense the fluid substance through the cavity in the stem (on the free end of which, external to the pump, a button of any known type is mounted) the pressing force which has to be exerted on the stem (examining the figures from FIG. 1 to FIG. 3) is only that required to overcome the thrust of the two springs 20 and 30 and to compress the fluid substance collected and contained in the chamber 8 to cause a seal lip 40 on the piston 4 to separate from a corresponding seal seat in a collar 50 projecting from the lower part of the stem 5 within the pump chamber 8. Pump operation therefore does not require a large force, and is equal to that required to dispense by pumps of known type mounted in known unsealed manner on fluid substance containers.

The return of the pump from the position reached at the end of its operating travel to its rest position (FIG. 1) by passing through an intake stage takes place smoothly merely under the thrust of the springs, and not with extreme difficulty as would occur with the pump-type dispensers of U.S. Pat. No. 3,211,346A, U.S. Pat. No. 4,511,069A and GB 1537436A, in which a hermetically sealed upper chamber is provided above the piston of each chamber (i.e. an aperture such as that indicated by the number 10 in the accompanying drawings does not exist).

The pump of the present invention is advantageously usable for dispensing pressurized fluids developing a saturated vapour pressure less than 2.8 kg/cm$^2$ at 54.4° C.

Reference will now be made to the pump embodiment shown in FIGS. 5 to 9. Such pump has substantially the same structure of the pump already described with reference to FIGS. 1 to 4 and the same reference numbers are used in such FIGS. 5 to 9 to indicate the same structural features. These identical pump portions and their working will therefore not be repeated here.

The interior of the cup-shaped body houses an annular piston 4 having an annular lip 41 which is translatable along and seals against the inner surface of the cup-shaped body, and respectively an annular lip 40 which is translatable along and seals against the outer surface of the hollow stem 5 (on the free end of which an operating and dispensing pushbutton B of any known type is mounted) translatable axially through the hole provided in the flange 2 and along the cavity of which the fluid substance can be expelled to the outside (and hence used), having been previously drawn into the lower pump chamber 8.

In a manner already known in the art, the lip 40 of the piston 4 is urged (by the spring 30 which rests on the collar 60 projecting from the upper part of the stem 5) against and onto the collar 50 to sealedly close the stem aperture 70, the purpose of which is to enable compressed fluid to pass from the chamber 8 to the stem cavity during fluid dispensing.

At the end of the delivery stroke, when the stem is pushed down to its travel limit, the collar 50 rests against a stop element 80 consisting of a constriction in the cross-section of the cup-shaped body 1 (FIG. 7), while the piston lip 40 remains resting on the adjacent upper surface of the collar 50, still sealedly closing the access aperture 70 to the stem cavity.

On being initially used, the pump has to be primed, i.e. the air initially contained in the chamber 8 has to be expelled therefrom, to enable a vacuum to be formed in this chamber for drawing into it, through the hole 3, the fluid present in the container on which the pump is mounted. This means that in passing from the rest position of FIG. 1 to the end-of-travel position with the stem lowered (of FIG. 7), if only air is present in the chamber 8 this air is compressed by the piston 4 and has to be expelled from said chamber, to enable the necessary vacuum to be created in the chamber for allowing the fluid to penetrate into said chamber through the hole 3.

For this purpose, short longitudinal ribs 90 (shown as four in number in the drawings) project from the inner surface 8 of the cup-shaped body 1 in proximity to the stop element 80 provided therein, the bottom of the lip 40 resting on these to undergo deformation (when the pump is pressed to its travel limit, shown in FIGS. 7, 7A and 8), to leave free those passageways (not numbered for simplicity but clearly visible in FIG. 8) which enable the compressed air possibly present in the chamber 8 to rise upwards between the opposing surfaces of the piston and cup-shaped body 1, and discharge into the chamber 9 (and from there into the container, through the aperture 10), possibly causing inward flexure of the thin upper part of the lip 40, at which recesses 100 visible in the cross-section of FIG. 9 can be provided to allow free passage of air above the piston.

In this manner, the pump can be easily primed.

The invention claimed is:

1. A pump for manually dispensing quantities of a fluid substance sealedly contained in a container, comprising:

a cup-shaped body having an open end, a closed end including a first hole, and an inner surface;

a ring cap sealed on the open end of the cup-shaped body, said ring cap including a second hole and including no other holes or apertures;

a hollow operating stem for dispensing the fluid substance contained in the container, the stem including an outer surface, and the stem extending from and being axially translatable through the second hole provided in said ring cap;

an annular piston sealedly translatable both along the inner surface of the cup-shaped body and along the outer surface of the stem, said piston having upper and lower surfaces; and a unidirectional valve, wherein the fluid substance can, via the unidirectional valve, enter through the first hole into a lower pump chamber in the cup-shaped body from which the substance can be expelled by being dispensed outside of the pump, wherein said lower pump chamber is bounded by the annular piston, wherein said stem with said piston defines an upper pump chamber in said cup-shaped body, wherein the outer surface of the stem forms a seal against an opposing surface of the second hole in the ring cap and maintains the seal throughout translation of the stem, and wherein in the cup-shaped body there is provided at least one passageway which connects said upper chamber to the container outside of said cup-shaped body.

2. A pump according to claim 1, wherein from the cup-shaped body there projects into said lower pump chamber a stop element on which a lower collar of the stem rests and halts when the stem is pressed to an end-of-travel position, wherein a lip of the piston is kept urged by a spring towards and against said lower collar to close an aperture connecting the lower pump chamber to an inside of said hollow stem, and wherein from the inner surface of the cup-shaped body in proximity to and above said stop element there projects at least one short longitudinal rib on which a lower edge of the piston lip rests and is deformed to leave free a passageway between the lip and an opposing surface of the cup-shaped body.

3. A pump as claimed in claim 2, wherein at least one longitudinal groove is provided in an outer upper part of the piston lip to locally distance said lip from an adjacent surface of the cup-shaped body.

4. A pump as claimed in claim 1, wherein the container is a rigid container and said ring cap is mounted and sealedly fixed on a mouth of the container containing said fluid substance and a pressurized gas.

5. A pump as claimed in claim 4, wherein said pressurized gas is evolved from at least one low-boiling liquid having a saturated vapour pressure less than 1.00 kg/cm$^2$ at 15° C. and less than 2.8 kg/cm$^2$ at 37.8° C.

6. A pump as claimed in claim 5, wherein said low-boiling liquid is a fluid chemical substance which has a boiling point between +15° C. and +85° C. and develops pressure of about 1 atm.

7. A pump as claimed in claim 6, wherein said low-boiling liquid is chosen from the group consisting of isopentane, isohexane, N-pentane, Nhexane, dichloromethane, monochloropropane, 1-1-dichloroethane, 2-chlorobutane, trichloro-fluoro-methane CFC 11, trichloro-tifluoro-ethane CFC 113, ethyl ether, methylene-dimethylether, dimethoxymethane and acetone.

8. A pump as claimed in claim 1, wherein equal pressures act on the upper and lower surfaces of the piston when the pump is in a rest position.

9. A pump as claimed in claim 2, wherein the container is a rigid container and said ring cap is mounted and sealedly fixed on a mouth of the container containing said fluid substance and a pressurized gas.

10. A pump as claimed in claim 9, wherein said pressurized gas is evolved from at least one low-boiling liquid having a saturated vapour pressure less than 1.00 kg/cm$^2$ at 15° C. and less than 2.8 kg/cm$^2$ at 37.8° C.

11. A pump as claimed in claim 10, wherein said low-boiling liquid is a fluid chemical substance which has a boiling point between +15° C. and +85° C. and develops a pressure of about 1 atm.

12. A pump as claimed in claim 11, wherein said low-boiling liquid is chosen from the group consisting of isopentane, isohexane, N-pentane, Nhexane, dichloromethane, monochloropropane, 1-1-dichloroethane, 2-chlorobutane, trichloro-fluoro-methane CFC 11, trichloro-tifluoro-ethane CFC 113, ethyl ether, methylene-dimethylether, dimethoxymethane and acetone.

13. A pump as claimed in claim 3, wherein the container is a rigid container and said ring cap is mounted and sealedly fixed on a mouth of the container containing said fluid substance and a pressurized gas.

14. A pump as claimed in claim 13, wherein said pressurized gas is evolved from at least one low-boiling liquid having a saturated vapour pressure less than 1.00 kg/cm$^2$ at 15° C. and less than 2.8 kg/cm$^2$ at 37.8° C.

15. A pump as claimed in claim 14, wherein said low-boiling liquid is a fluid chemical substance which has a boiling point between +15° C. and +85° C. and develops pressure of about 1 atm.

16. A pump as claimed in claim 15, wherein said low-boiling liquid is chosen from the group consisting of isopentane, isohexane, N-pentane, Nhexane, dichloromethane, monochloropropane, 1-1-dichloroethane, 2-chlorobutane, trichloro-fluoro-methane CFC 11, trichloro-tifluoro-ethane CFC 113, ethyl ether, methylene-dimethylether, dimethoxymethane and acetone.

* * * * *